(12) United States Patent
Vinci et al.

(10) Patent No.: US 7,860,767 B1
(45) Date of Patent: Dec. 28, 2010

(54) SYSTEMS AND METHODS FOR FINANCING MULTIPLE ASSET CLASSES OF COLLATERAL

(75) Inventors: James Vinci, Franklin Lakes, NJ (US); Pierro Turgeon, Astoria, NY (US); Sylvia Lam, Brooklyn, NY (US); Venkatesh Ramamurthi, New York, NY (US)

(73) Assignee: Morgan Stanley, New York, NY (US)

( * ) Notice: Subject to any disclaimer, the term of this patent is extended or adjusted under 35 U.S.C. 154(b) by 577 days.

(21) Appl. No.: 11/239,911

(22) Filed: Sep. 30, 2005

(51) Int. Cl.
*G06Q 40/00* (2006.01)

(52) U.S. Cl. .......................................................... 705/35

(58) Field of Classification Search ..................... 705/37
See application file for complete search history.

(56) References Cited

U.S. PATENT DOCUMENTS

| | | | |
|---|---|---|---|
| 6,016,482 A * | 1/2000 | Molinari et al. ................ 705/35 |
| 6,321,212 B1 | 11/2001 | Lange | |
| 6,654,727 B2 * | 11/2003 | Tilton ........................ 705/36 R |
| 6,988,082 B1 * | 1/2006 | Williams et al. ........... 705/36 T |
| 7,149,720 B2 * | 12/2006 | Shepherd ...................... 705/37 |
| 7,480,632 B2 * | 1/2009 | Fudali et al. .............. 705/36 R |
| 7,593,893 B1 * | 9/2009 | Ladd et al. ..................... 705/38 |
| 2002/0052818 A1 * | 5/2002 | Loveland ...................... 705/36 |
| 2002/0069122 A1 * | 6/2002 | Yun et al. ...................... 705/26 |
| 2002/0087457 A1 | 7/2002 | Madeley et al. | |
| 2002/0123960 A1 * | 9/2002 | Ericksen ...................... 705/38 |
| 2003/0036993 A1 * | 2/2003 | Parthasarathy ............... 705/38 |
| 2003/0120566 A1 | 6/2003 | Lipschutz et al. | |
| 2004/0153388 A1 * | 8/2004 | Fisher et al. .................. 705/36 |
| 2004/0267660 A1 * | 12/2004 | Greenwood et al. ........... 705/38 |
| 2005/0065871 A1 * | 3/2005 | Gerhart et al. ................ 705/38 |
| 2005/0102229 A1 * | 5/2005 | Kemper et al. ................ 705/39 |
| 2005/0256747 A1 * | 11/2005 | Hellrigel ........................ 705/4 |
| 2006/0010064 A1 * | 1/2006 | Noriega et al. ................ 705/37 |
| 2006/0089895 A1 * | 4/2006 | Joye et al. ..................... 705/35 |
| 2006/0265296 A1 * | 11/2006 | Glinberg et al. ............... 705/35 |
| 2006/0282356 A1 * | 12/2006 | Andres et al. ................. 705/35 |
| 2006/0293985 A1 * | 12/2006 | Lederman et al. ............. 705/35 |
| 2007/0100725 A1 * | 5/2007 | Devito ..................... 705/36 R |

OTHER PUBLICATIONS

Government Securities Clearing Corporation Service Bulletin: Cross-Margining of Cash and Futures Positions for U.S. Treasury Securities. Feb. 16, 2000.*

The Link Between Default and Recovery Rates: Theory, Empirical Evidence and Implications, Edward Altman, Journal of Business, vol. 78, Issue 6, 2005, pp. 2203-2227.*

(Continued)

*Primary Examiner*—Alexander Kalinowski
*Assistant Examiner*—Bruce I Ebersman
(74) *Attorney, Agent, or Firm*—K&L Gates LLP (57) ABSTRACT

A method of determining an interest rate to be applied against a debit amount in a collateralized lending transaction. The method includes identifying a plurality of assets to be used as collateral, grouping the assets by class, and assigning an interest rate to each class of assets. The method also includes allocating the debit amount to each of the asset classes based on market values of the assets, calculating a blended interest rate based on the allocated debit amounts, and applying the blended interest rate to the debit amount to determine the accrual amount due on the debit amount.

13 Claims, 6 Drawing Sheets

OTHER PUBLICATIONS

The Corporate Bond Yield Spreads and the Term Structure, Ronald Anderson, Finance, Journal vol. 21, Issue 2, 2000 pp. 15-37.*

DRKw Announces New Management Team for Prime Brokerages., Press Archive, Oct. 22, 2004, 2 pages.*

Cover article, *Profit & Loss*, vol. 6, Issue 54, Sep. 2004, 7 pages.

"Investment banking in global financial markets," printed from http://www.drkw.com/eng/press/1232_2553.php Internet site, accessed on Feb. 13, 2005, 2 pages.

"CSFB evaluates lunching cross-margining system," printed from http://www.dialogweb.com/dgi/dwclient?reg=1108331318615, Internet site, accessed on Feb. 13, 2005, 2 pages.

* cited by examiner

DAILY OPTIMIZED DEBIT RATE CALCULATION REPORT

*As of June 03 2005*

CLIENT:

Account :  
Account Name: :

Report ID: IN161

| Asset Class | Priority | Marginable LMV | Actual Debit | Rate | Accrual |
|---|---|---|---|---|---|
| USD | | | | | |
| Long Treasury | 1 | 27,652,424 | 27,652,424 | 3.0500 | 2,342.77 |
| Long Investment Grade | 3 | 6,126,048 | 6,126,048 | 3.2000 | 544.54 |
| Long Equity | 4 | 7,967,370 | 2,427,099 | 3.3500 | 225.86 |
| Long Non-Investment Grade | 5 | 6,924,960 | 0 | 3.3500 | 0.00 |
| | | 48,670,802 | 36,205,570 | 3.0955 | 3,113.17 |

FIG. 2

DAILY OPTIMIZED DEBIT FORECAST REPORT
As of Jun 03 2005
CLIENT:

Account :
Account Name :
Report ID: IN162

| CUSIP | Description | LMV | Margin Req. | Marginable LMV | Margin % | Cumulative Priority | Class | Rate | Eff Rate |
|---|---|---|---|---|---|---|---|---|---|
| USD | | | | | | | | | |
| 012929DM0 | NOTE 4.0 02/16/16 | 28,000,008 | 1,160,080 | 27,930,049 | 4% | 27,930,048 | 4LT | FEDFUNDEFF + 0.050 | 3.07 |
| | Subtotal for Long Treasury | 28,999,008 | 1,159,960 | 27,939,048 | | | | | |
| 233835AQ0 | DCX 8.5 18JAN2031 | 8,248,720 | 2,061,680 | 6,185,040 | 25% | 34,024,088 | 3LI | FEDFUNDEFF+ 0.200 | 3.22 |
| | Subtotal for Long Investment Grade | 8,246,720 | 2,061,680 | 6,185,040 | | | | | |
| 338032204 | FISHER SCIENTIFIC INTL INC COM | 90,936 | 0 | 90,936 | 0% | 34,115,024 | 4LE | OPENFED + 0.350 | 3.35 |
| 61746Y486 | MORGAN STANLEY MANDATORILY EXCH | 10,456,000 | 3,659,250 | 6,795,750 | 35% | 40,910,774 | 4LE | OPENFED + 0.350 | 3.35 |
| 652485608 | NEWS CORPORATION LIMITED | 1,766,960 | 618,086 | 1,147,874 | 35% | 42,058,648 | 4LE | OPENFED + 0.350 | 3.35 |
| 990D0QVD3 | OXIANA LIMITED | 267,087 | 0 | 267,087 | 0% | 42,325,734 | 4LE | OPENFED + 0.350 | 3.35 |
| | Subtotal for Long Equity | 12,578,983 | 4,277,336 | 8,301,647 | | | | | |
| 004540AB5 | ACLS 4.20 01-05-07 | 2,004,135 | 722,447 | 1,341,088 | 35% | 42,007,422 | 5LN | FEDFUNDEFF + 0.350 | 3.37 |
| 105756AE0 | BRAZIL 10.125 16MAY2027 | 181,335 | 63,487 | 117,869 | 35% | 43,785,290 | 5LN | FEDFUNDEFF + 0.350 | 3.37 |
| 420028A04 | HWTEL 8.75 01MAY2010 144A | 1,072,000 | 404,720 | 1,207,200 | 20% | 40,022,070 | 5LN | FEDFUNDEFF + 0.350 | 0.07 |
| 444903AH1 | HGSI 3.75 03/07 (REGS) | 613,800 | 214,830 | 398,970 | 35% | 45,421,540 | 5LN | FEDFUNDEFF + 0.350 | 3.37 |
| 976287AC7 | TARR 8.00% 00/00 | 1,758,760 | 582,800 | 1,105,060 | 32% | 46,617,400 | 5LN | FEDFUNDEFF + 0.350 | 3.37 |
| 880349AD7 | TEN 10.25 16JUL2013 | 1,800,000 | 360,000 | 1,440,000 | 20% | 48,057,490 | 5LN | FEDFUNDEFF + 0.350 | 3.37 |
| 999923AS4 | FIRST PACIFIC 0% CB EXP 01/18/2010 | 2,120,000 | 742,000 | 1,378,000 | 35% | 49,435,490 | 5LN | FEDFUNDEFF + 0.350 | 3.37 |
| | Subtotal for Long Non-Investment Grade | 10,210,020 | 3,100,265 | 7,109,756 | | | | | |
| | Total for USD | 60,034,731 | 10,599,241 | | | 49,435,490 | | | |

FIG. 3

DAILY OPTIMIZED FINANCING POSITION DETAIL REPORT

As of Jun 03 2005

Account :
Account Name :
CLIENT:

Report ID: IN163

| CUSIP | Description | LMV | Margin Req. | Marginable LMV | Margin % | Cumulative | Priority Class | Rate | Eff Rate |
|---|---|---|---|---|---|---|---|---|---|
| USD | | | | | | | | | |
| 912828DM9 | NOTE 4.0 02/15/15 | 28,804,608 | 1,152,184 | 27,652,424 | 4% | 27,652,424 | 1 LT | FEDFUNDEFF + 0.050 | 3.05 |
| | Subtotal for Long Treasury | 28,804,608 | 1,152,184 | 27,652,424 | | | | | |
| 233935AQ0 | DCX 9.5 19JAN2021 | 8,169,064 | 2,042,018 | 6,128,049 | 25% | 33,779,472 | 3 LI | FEDFUNDEFF + 0.200 | 3.20 |
| | Subtotal for Long Investment Grade | 8,160,064 | 2,042,016 | 6,126,040 | | | | | |
| 338032204 | FISHER SCIENTIFIC INTL INC COM | 90,533 | 31,686 | 58,846 | 35% | 33,837,318 | 4 LE | OPENFED + 0.350 | 3.35 |
| 61748Y486 | MORGAN STANLEY MANDATORILY EXCH | 10,401,000 | 3,640,350 | 6,760,650 | 35% | 40,597,969 | 4 LE | OPENFED + 0.300 | 3.35 |
| 65248C008 | NEWS CORPORATION LIMITED | 1,765,900 | 618,080 | 1,147,874 | 35% | 41,745,642 | 4 LE | OPENFED + 0.300 | 3.35 |
| | Subtotal for Long Equity | 12,257,493 | 4,290,122 | 7,967,370 | | | | | |
| D3454CAD5 | ACLC 4.26 01-16-07 | 2,064,136 | 722,447 | 1,341,609 | 35% | 43,097,500 | 5 LN | FEDFUNDEFF + 0.350 | 3.35 |
| 105756AE0 | BRAZIL 10.125 15MAY2027 | 179,373 | 62,780 | 116,592 | 35% | 43,204,122 | 5 LN | FEDFUNDEFF + 0.350 | 3.35 |
| 420029A04 | WTCL 9.75 01MAY2010 144A | 1,004,090 | 407,045 | 1,240,100 | 20% | 44,400,203 | 5 LN | FEDFUNDEFF + 0.350 | 0.05 |
| 444903AH1 | HGS13.75 03/07 (REGS) | 613,800 | 214,830 | 398,970 | 35% | 44,849,262 | 5 LN | FEDFUNDEFF + 0.350 | 3.35 |
| 676267AC7 | TARK 0.00% 09/09 | 1,746,750 | 559,000 | 1,169,150 | 32% | 46,030,402 | 5 LN | FEDFUNDEFF + 0.350 | 3.35 |
| 880349AD7 | TEN 10.25 15JUL2013 | 1,792,000 | 537,600 | 1,264,400 | 30% | 47,292,802 | 5 LN | FEDFUNDEFF + 0.350 | 3.35 |
| 999923A34 | FIRST PACIFIC 0% CB EXP 01/16/20 10 | 2,120,000 | 742,000 | 1,376,000 | 35% | 46,070,602 | 5 LN | FEDFUNDEFF + 0.350 | 3.35 |
| | Subtotal for Long Non-Investment Grade | 10,202,058 | 3,277,038 | 6,924,960 | | | | | |
| | Total for USD | 69,432,222 | 10,761,420 | 49,670,902 | | | | | |

SYSTEMS AND METHODS FOR FINANCING MULTIPLE ASSET CLASSES OF COLLATERAL

BACKGROUND

In transactions in which money is lent to a borrower, the borrower often desires to have the loan collateralized so that the borrower can borrow the money on better terms. In such a case, the borrower pledges an asset as security to the lender such that, if the borrower defaults, the lender may take possession of the asset to satisfy any unpaid loan amounts. Various financial services entities often offer debit or margin financing to its customers and the customers often use various securities as collateral for the financing.

In such cases, the financial services entity determines an interest rate to apply to the borrowed money (i.e., the debit amount). The interest rate may be based on the type of collateral (usually securities) that is offered as security by the borrower. Oftentimes the collateral offered by the borrower varies in nature and quality and the interest rate that is set by the financial services entity may have little or no correlation with the types of collateral that are being offered.

SUMMARY

In various embodiments, the present invention is directed to a method of determining an interest rate to be applied against a debit amount in a collateralized lending transaction. The method includes identifying a plurality of assets to be used as collateral, grouping the assets by class, and assigning an interest rate to each class of assets. The method also includes allocating the debit amount to each of the asset classes based on market values of the assets, calculating a blended interest rate based on the allocated debit amounts, and applying the blended interest rate to the debit amount to determine the accrual amount due on the debit amount.

In various embodiments, the present invention is directed to a computer system. The computer system includes a processor and a storage medium in communication with the processor, the storage medium having stored thereon instructions which, when executed by the processor, cause the processor to:

group a plurality of assets to be used as collateral by class;
assign an interest rate to each class of assets;
allocate a debit amount to each of the asset classes based on market values of the assets;
calculate a blended interest rate based on the allocated debit amounts; and
apply the blended interest rate to the debit amount to determine the accrual amount due on the debit amount.

In various embodiments, the present invention is directed to an apparatus for determining an interest rate to be applied against a debit amount in a collateralized lending transaction. The apparatus includes means for identifying a plurality of assets to be used as collateral, means for grouping the assets by class, and means for assigning an interest rate to each class of assets. The apparatus also includes means for allocating the debit amount to each of the asset classes based on market values of the assets, means for calculating a blended interest rate based on the allocated debit amounts, and means for applying the blended interest rate to the debit amount to determine the accrual amount due on the debit amount.

In various embodiments, the present invention is directed to a computer readable medium having stored thereon instructions which, when executed by a processor, cause the processor to:

group a plurality of assets to be used as collateral by class;
assign an interest rate to each class of assets;
allocate a debit amount to each of the asset classes based on market values of the assets;
calculate a blended interest rate based on the allocated debit amounts; and
apply the blended interest rate to the debit amount to determine the accrual amount due on the debit amount.

BRIEF DESCRIPTION OF THE FIGURES

FIG. 2 illustrates an embodiment of a rate calculation report that may be used to show how a blended rate is arrived at;

FIG. 3 illustrates an embodiment of a report of a debit rate forecast;

FIG. 4 illustrates an embodiment of a financing position detail report; and

DESCRIPTION

Various embodiments of the present invention may be employed to provide a borrower with an optimized rate in a collateralized transaction. In various embodiments, an analysis is performed so that the highest quality collateral (i.e., the collateral that results in the cheapest debit rate) is considered first, followed by collateral of declining quality to yield a blended debit rate. The collateral may consist of, for example, assets (e.g., securities) in which the borrower has a long position.

Figure 1A:
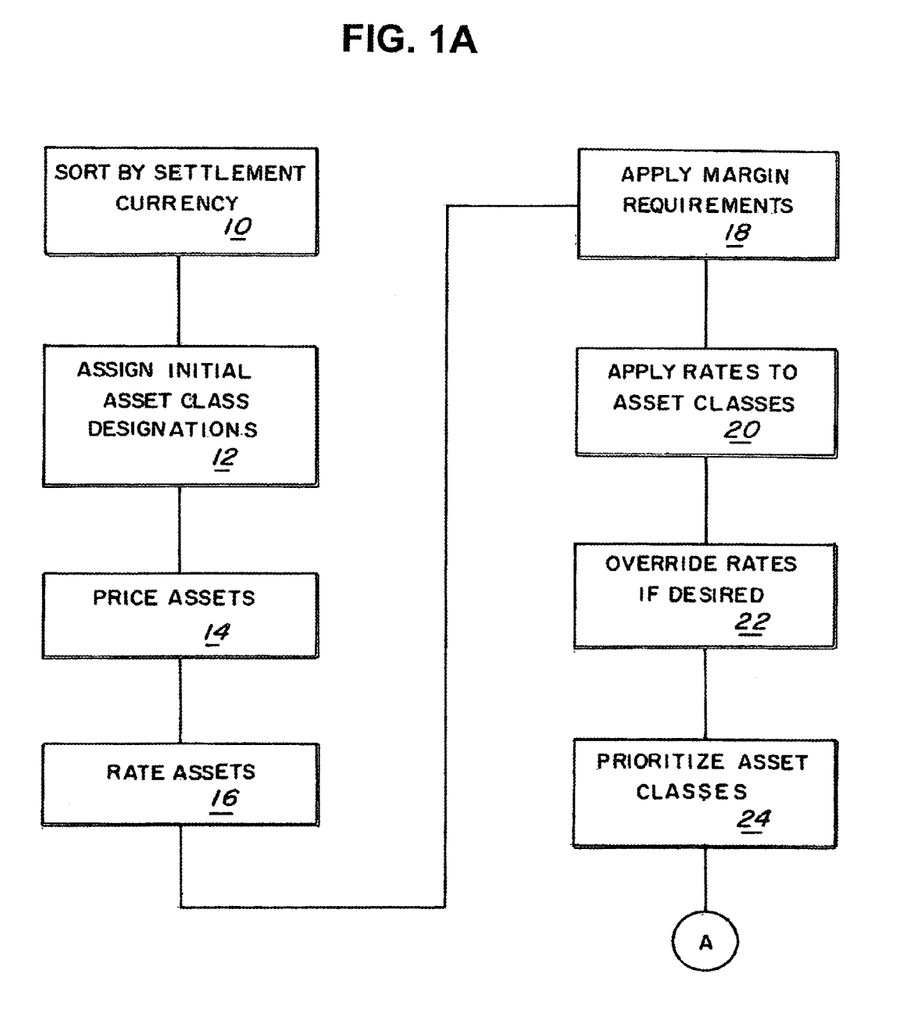
FIGS. 1A and 1B illustrate an embodiment of a process for determining a financing rate for a collateralized lending transaction.
Figure 1B:
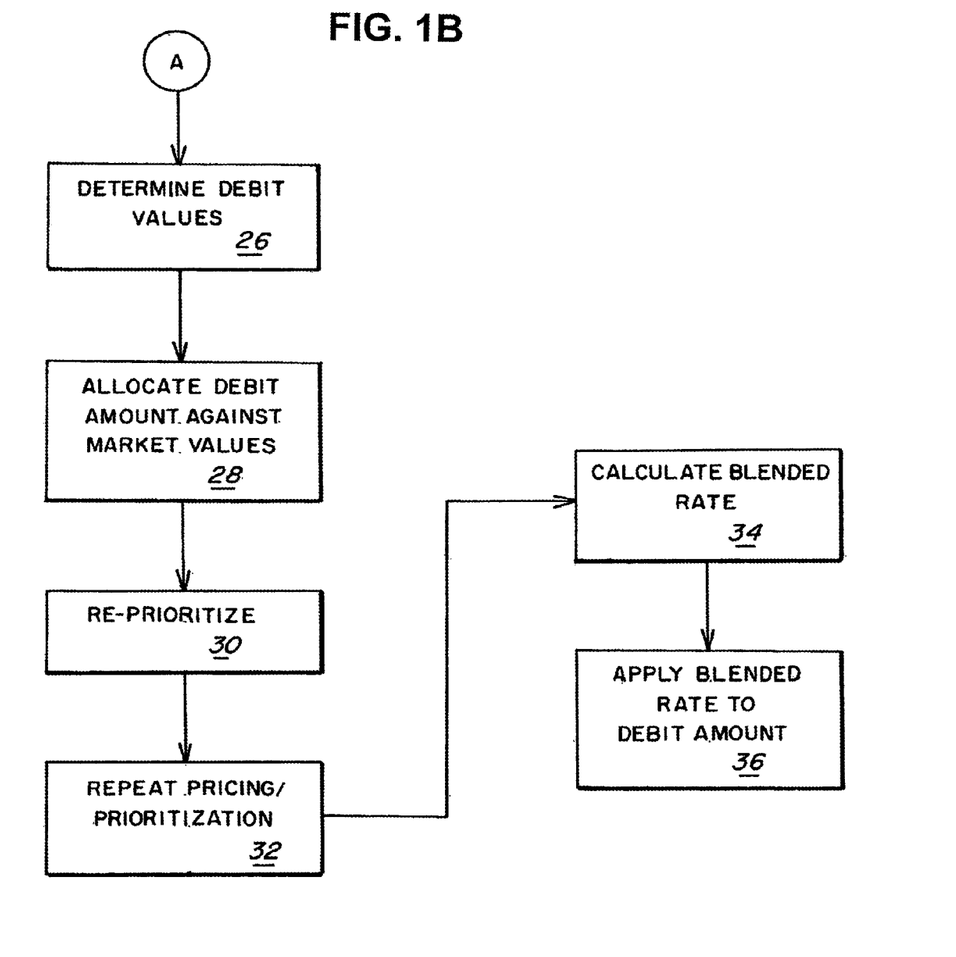

FIGS. 1A and 1B illustrate an embodiment of a process for determining a financing rate for a collateralized lending transaction. At step 10 the collateral (e.g., collateral in which the borrower has a long position) of the borrower is sorted by settlement currency and asset type and at step 12 an initial asset class designation is assigned based on the security type of each collateral asset. In various embodiments, the settlement currency of the collateral may be standardized such that all of the collateral values are in one currency such as, for example, the U.S. dollar or the Euro. The classes may be, for example, treasuries, agencies, sovereign debt, equity, convertible preferred, non-investment/investment grade corporate debt, non-investment/investment grade convertible debt, mortgage-backed debt, asset-backed bonds debt, distressed debt, etc.

At step 14, the collateral assets are priced, taking into account application of conversion currencies, multipliers, factors, etc. At step 16, the collateral assets are rated for investment grade status when applicable.

At step 18, the value of the collateral assets may be discounted based on, for example, a borrower-specific table. The discount may reflect, for example, the amount of the collateral that was not purchased on margin. At step 20, interest rates are assigned to each asset class and at step 22 one or more of the rates assigned to the asset classes may be overridden based on, for example, a predetermined agreement with the borrower that various rates would be overridden on, for example, a CUSIP-level basis because an asset is, for example, deemed to be trading "special." At step 24, the list of collateral is initially prioritized by asset class such that, for example, the highest quality collateral is listed first in the collateral list.

At step 26 in FIG. 1B debit values are determined for each collateral asset class. At step 28, the debit amount is allocated against the market values of each collateral asset class. At step 30, accruals are calculated for the collateral and the collateral may be re-prioritized. At step 32, collateral pricing and prioritization may be repeated if desired. At step 34 a blended interest rate is calculated. At step 36, the blended rate is applied to the debit amount for the borrower.

Figure 2:
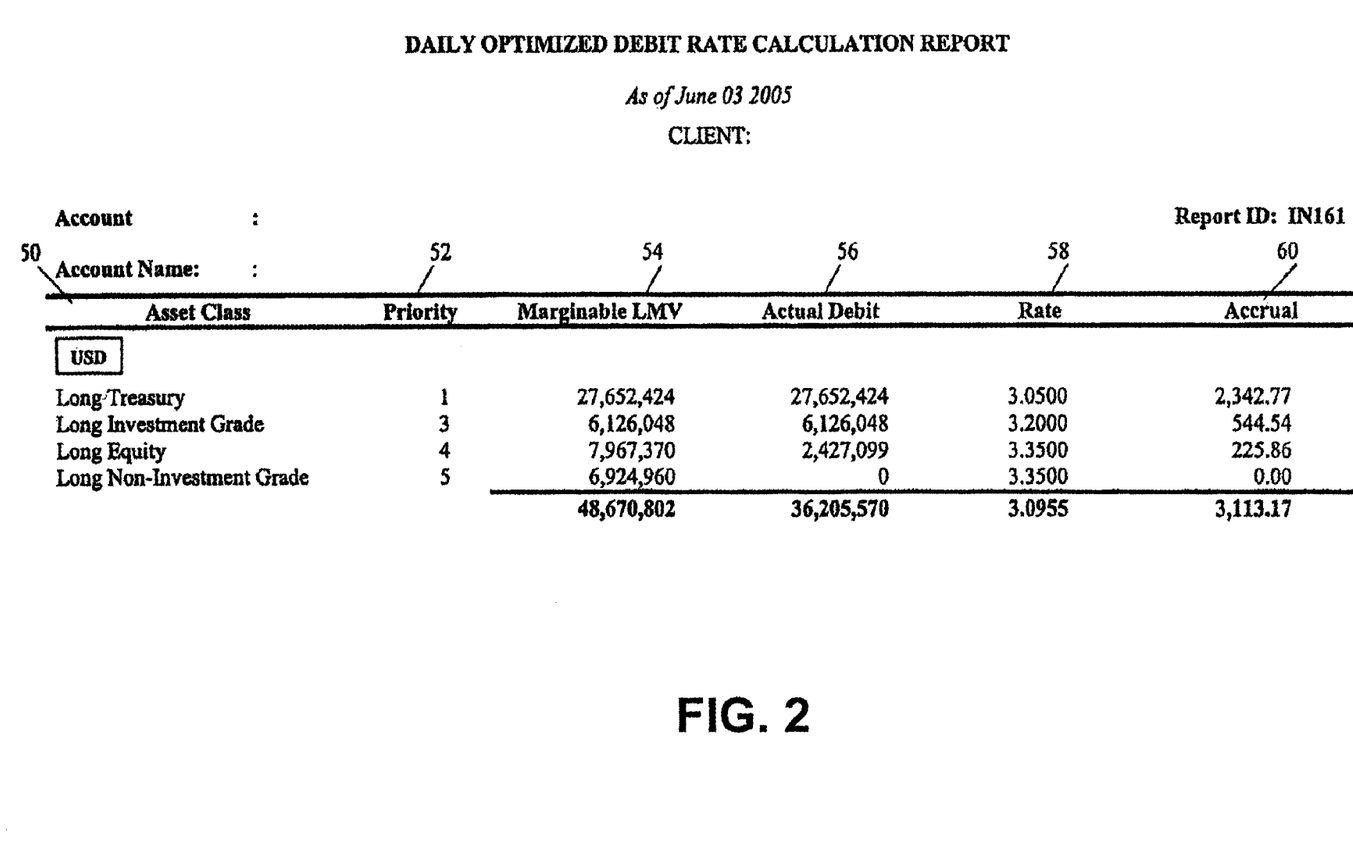

FIG. 2 illustrates an embodiment of a rate calculation report that may be used to show how a blended rate is arrived at. As can be seen in FIG. 2, a borrower's (i.e., client's) asset classes are listed in an asset class column 50. Each asset class has a priority as illustrated in a priority column 52. The marginable long market value (LMV) of the collateral is listed for each asset class in column 54. The marginable LMV represents the LMV of the collateral less any amount, or percentage of the collateral, that cannot be used to collateralize the debit.

In the example illustrated in FIG. 2, the total debit value in the transaction is $36,205,570. An actual debit column 56 shows the allocation of the debit value among the asset classes, with the highest priority (i.e., easiest to finance) collateral being matched with a debit amount equal to the LMV of the collateral in the asset class and with each successive lower priority asset class receiving a share of the debit value up to the marginable LMV until the debit value is exhausted.

A rate column 58 illustrates the debit rate that is applied to each asset class, with higher priority asset classes receiving a lower, or more favorable, rate. An accrual column 60 illustrates the daily accrual for each asset class. The blended rate for the illustration in FIG. 2 is 3.0955 which results in an accrual of $3113.17. If such an analysis were not done and the highest rate of 3.3500 were used in the transaction, the accrual would be 3369.13. Thus, the borrower realizes a savings when the methods of the various embodiments of the present invention are used.

FIG. 3 illustrates an embodiment of a report of a debit rate forecast that may be generated for a borrower so that the borrower can ascertain what a likely rate will be given the borrower's present collateral position. A CUSIP column 61 and a description column 62 describe each collateral asset by CUSIP number and name. An LMV column 64 illustrates the value of each asset and a margin requirement column 66 illustrates the amount of the asset that was not bought on margin. A marginable LMV column 68 illustrates the value of the asset after the margin requirement is subtracted from the LMV and a margin percentage column 70 illustrates what fraction the margin requirement is of the LMV.

A cumulative column 72 illustrates a running total of the collateral for all classes and a priority class column 74 identifies the priority class of each asset. A rate column illustrates what rate is in place for each class (i.e., fed+a fixed value). An effective rate column 78 illustrates the effective debit rate for each asset.

FIG. 4 illustrates an embodiment of a report of a financing position detail report. The report illustrated in FIG. 4, including the columns therein, is similar to the report illustrate in FIG. 3, but is a daily summary rather than a projection. The report illustrated in FIG. 4 may be generated for a borrower so that the borrower can ascertain what the rate was on a daily basis given the borrower's collateral position that day.

Figure 5:
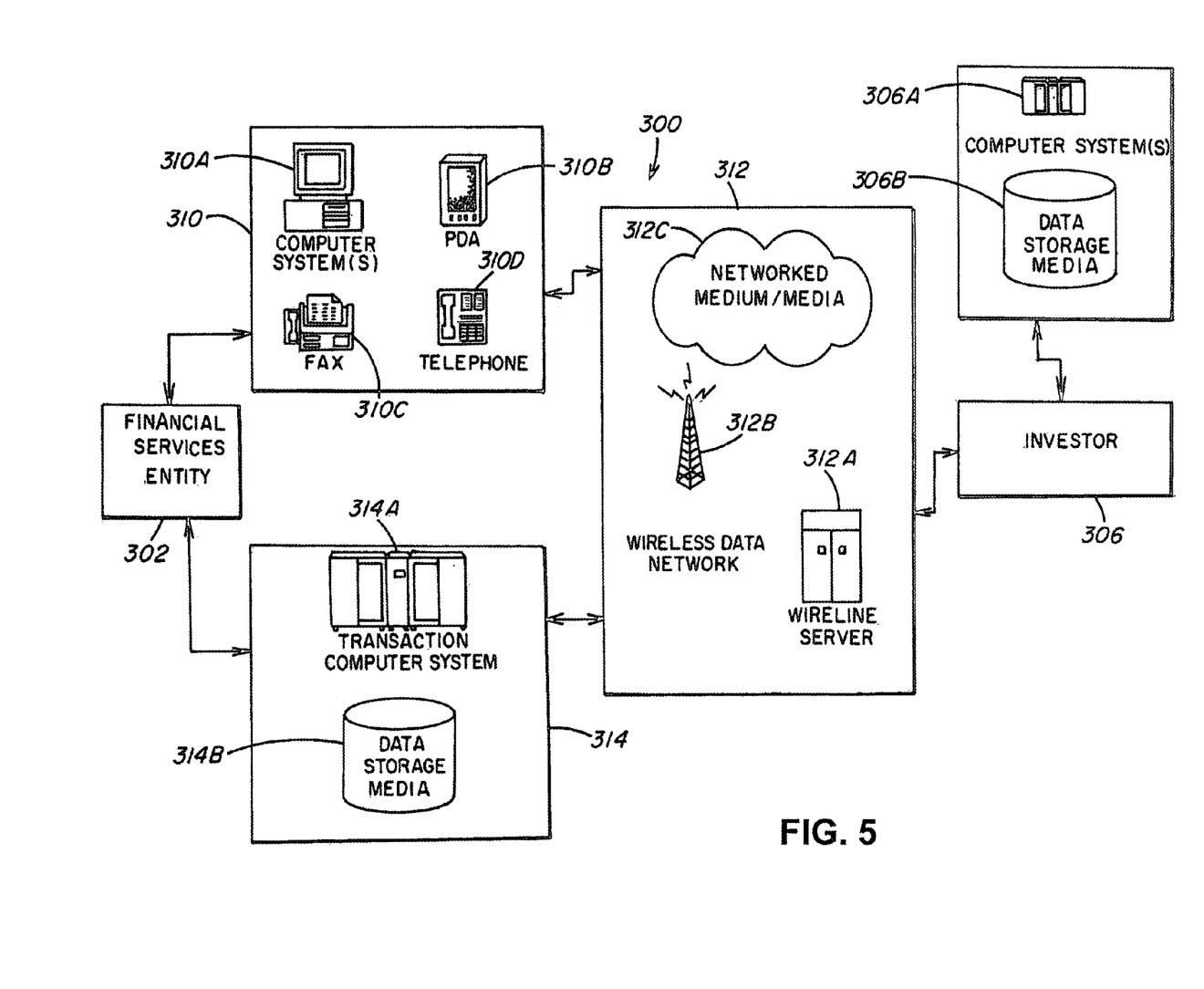
FIG. 5 illustrates a schematic diagram of examples of system and computer-readable medium embodiments provided in accordance with the present invention.

FIG. 5 illustrates a schematic diagram of examples of system and computer-readable medium embodiments provided in accordance with the present invention. As shown, a financial services entity 302 may communicate and/or exchange data with an investor 306. In various aspects, the financial services entity 302 may be operatively associated with one or more communications devices 310 such as, for example and without limitation, a computer system 310A, a personal digital assistant 310B, a fax machine 310C, and/or a telephone 310D (e.g., a wireline telephone, a wireless telephone, a pager, and the like), and/or other like communication devices. The communication devices 310 permit the financial services entity 302 and the investor 306 to communicate between/among each other through one or more communication media 312, such as by employing electronic mail communicated through one or more computer systems, for example. The communication media 312 may include, for example and without limitation, wireline communication means such as a wireline server 312A, a wireless data network 312B, and/or a connection through a networked medium or media 312C (e.g., the Internet, an extranet, an intranet, a wide area network (WAN), and/or a local area network (LAN)).

In addition, the financial services entity 302 (as well as the investor 306) may be operatively associated with one or more data processing/storage devices such as data processing/storage devices 314, for example. The financial services entity 302 may be operatively associated with one or more transaction computer systems 314A, for example, and/or one or more data storage media 314B configured to receive, store, analyze and/or otherwise process data and other information in association with communications that occur between/among the financial services entity 302 and the investor 306. In various aspects, the financial services entity 302 may be operatively associated, for example, with one or more accounting computer systems 314C and/or one or more tax computer systems 314D. The accounting/tax computer systems 314C, 314D may be configured for receiving, storing, and/or processing accounting/tax data, among other types of data, associated with one or more aspects of hedging securities, for example, of the present invention.

In various aspects, the investor 306 may be operatively associated with one or more computer systems 306A and/or one or more data storage media 306B. It can be appreciated that one or more of the computer systems 306A, 314A, 314C, 314D and/or one or more of the data storage media 306B, 314B may be employed to communicate, store, analyze, and/or otherwise process data related to financial transactions occurring between/among the financial services entity 302 and the investor 306. It can be understood that one or more steps of the methods described herein may be performed using, for example, any of the computer systems 310, 306A, and 314A. Also, in various embodiments of the present invention, market data may be input and stored on, for example, any of the data storage media 306B, 314B and/or on a storage medium or media on the computer system 310A.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein. It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. A method of determining an interest rate to be applied against a debit amount, the method comprising:
   identifying a plurality of assets held by a borrower to be used as collateral for a loan by the borrower for the debit amount in a collateralized lending transaction between the borrower and a lender, wherein the lender is entitled to take possession of the collateral to satisfy an unpaid amount on the loan, wherein the assets comprise securities;
   grouping the assets held by the borrower to be used as collateral for the loan, by a computer system, into two or more classes on a daily basis, wherein the classes comprise classes of securities, and wherein the computer system comprises a processor and computer-readable medium;
   assigning, by the computer system, a daily interest rate to each class of assets on a daily basis;
   prioritizing, by the computer system, the assets classes on a daily basis, wherein asset classes having a lower interest rate are prioritized higher than asset classes having a higher interest rate;
   allocating, by the computer system, the debit amount to each of the asset classes on a daily basis based on the prioritization of the asset classes and marginable market values of the assets held in each of the asset classes;
   calculating, by the computer system, a blended interest rate on a daily basis, the blended interest rate comprising a weighted average of the daily interest rates assigned to the two or more asset classes, wherein the weighted average is determined based on the daily interest rate assigned to each asset class and the ratio of the allocated debit amount for each class to the debit amount; and
   applying, by the computer system, the blended interest rate to the debit amount on a daily basis to determine an interest accrual amount due on the debit amount.

2. The method of claim 1, further comprising calculating the debit amount.

3. The method of claim 1, further comprising calculating an accrual for the assets and re-prioritizing the asset classes prior to calculating the blended interest rate.

4. The method of claim 1, further comprising:
   determining prices of the assets; and
   discounting the prices of the assets to determine the marginable market values of the assets.

5. The method of claim 2, further comprising calculating the debit amount prior to allocating the debit amount to each of the asset classes.

6. A computer system, comprising:
   a processor; and
   a storage medium in communication with the processor, the storage medium having stored thereon instructions which, when executed by the processor, cause the processor to:
   for a plurality of assets held by a borrower that have been identified for use as collateral for a loan by the borrower for a debit amount in a collateralized lending transaction between the borrower and a lender, wherein the lender is entitled to take possession of the collateral to satisfy an unpaid amount on the loan and wherein the assets comprise securities, group the assets held by the borrower to be used as collateral for the loan into two or more classes on a daily basis, wherein the classes comprise classes of securities;
   assign a daily interest rate to each class of assets on a daily basis;
   prioritize the asset classes on a daily basis, wherein asset classes having a lower interest rate are prioritized higher than asset classes having a higher interest rate;
   allocate the debit amount to each of the asset classes on a daily basis based on the prioritization of the asset classes and marginable market values of the assets held in each of the asset classes;
   calculate a blended interest rate on a daily basis, the blended interest rate comprising a weighted average of the daily interest rates assigned to the two or more asset classes, wherein the weighted average is determined based on the daily interest rate assigned to each asset class and the ratio of the allocated debit amount for each class to the debit amount; and apply the blended interest rate to the debit amount on a daily basis to determine an interest accrual amount due on the debit amount.

7. The system of claim 6, further comprising a transaction computer in communication with the processor.

8. The system of claim 6, further comprising an investor computer system in communication with the processor.

9. An apparatus for determining an interest rate to be applied against a debit amount, the apparatus comprising:

means for identifying a plurality of assets held by a borrower to be used as collateral for a loan by the borrower for the debit amount in a collateralized lending transaction between the borrower and a lender, wherein the lender is entitled to take possession of the collateral to satisfy an unpaid amount on the loan, wherein the assets comprise securities;

means for grouping the assets held by the borrower to be used as collateral for the loan into two or more classes on a daily basis, wherein the classes comprise classes of securities;

means for assigning a daily interest rate to each class of assets on a daily basis;

means for prioritizing the asset classes on a daily basis, wherein asset classes having a lower interest rate are prioritized higher than asset classes having a higher interest rate;

means for allocating the debit amount to each of the asset classes on a daily basis based on the prioritization of the asset classes and marginable market values of the assets held in each of the asset classes;

means for calculating a blended interest rate on a daily basis, the blended interest rate comprising a weighted average of the daily interest rates assigned to the two or more asset classes, wherein the weighted average is determined based on the daily interest rate assigned to each asset class and the ratio of the allocated debit amount for each class to the debit amount; and means for applying the blended interest rate to the debit amount on a daily basis to determine an interest accrual amount due on the debit amount.

10. The apparatus of claim 9, further comprising means for calculating the debit amount.

11. The apparatus of claim 9, further comprising means for calculating an accrual for the assets and re-prioritizing the asset classes.

12. The method of claim 4, wherein discounting the prices of the assets includes discounting the prices of the assets based on at least one of: information specific to the borrower and an amount of the assets not purchased on margin.

13. A computer readable medium having stored thereon instructions which, when executed by a processor, cause the processor to:

for a plurality of assets held by a borrower that have been identified for use as collateral for a loan by the borrower for a debit amount in a collateralized lending transaction between the borrower and a lender, wherein the lender is entitled to take possession of the collateral to satisfy an unpaid amount on the loan and wherein the assets comprise securities, group the assets held by the borrower to be used as collateral for the loan into two or more classes on a daily basis, wherein the classes comprise classes of securities;

assign a daily interest rate to each class of assets on a daily basis;

prioritize the asset classes on a daily basis, wherein asset classes having a lower interest rate are prioritized higher than asset classes having a higher interest rate;

allocate a debit amount to each of the asset classes on a daily basis based on the prioritization of the asset classes and marginable market values of the assets held in each of the asset classes;

calculate a blended interest rate on a daily basis, the blended interest rate comprising a weighted average of the daily interest rates assigned to the two or more asset classes, wherein the weighted average is determined based on the daily interest rate assigned to each asset class and the ratio of the allocated debit amount for each class to the debit amount; and apply the blended interest rate to the debit amount on a daily basis to determine an interest accrual amount due on the debit amount.

\* \* \* \* \*